(12) United States Patent
Chang et al.

(10) Patent No.: US 7,355,655 B2
(45) Date of Patent: Apr. 8, 2008

(54) SYSTEMS AND METHODS FOR SEPARATING LUMA AND CHROMA INFORMATION IN A COMPOSITE VIDEO SIGNAL

(75) Inventors: Weider Peter Chang, Hurst, TX (US); Karl Renner, Dallas, TX (US); Ramesh M. Chandrasekaran, Plano, TX (US); Steven Clynes, Allen, TX (US); Jason Meiners, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 479 days.

(21) Appl. No.: 11/135,758

(22) Filed: May 24, 2005

(65) Prior Publication Data

US 2006/0268178 A1 Nov. 30, 2006

(51) Int. Cl.
*H04N 9/66* (2006.01)

(52) U.S. Cl. .............. 348/641; 348/638; 348/668; 348/609

(58) Field of Classification Search ........ 348/663–670, 348/638–641, 609, 724, 726, 727; *H04N 9/66*
See application file for complete search history.

(56) References Cited

U.S. PATENT DOCUMENTS

| | | | |
|---|---|---|---|
| 4,179,705 A | 12/1979 | Faroudja | |
| 4,786,963 A | 11/1988 | McNeely et al. | |
| 4,864,389 A | 9/1989 | Faroudja et al. | |
| 5,161,006 A | 11/1992 | Monta et al. | |
| 5,218,435 A | 6/1993 | Lim et al. | |
| 5,430,500 A | 7/1995 | Hoshino et al. | |
| 5,523,850 A | 6/1996 | Kanda et al. | |
| 5,526,060 A | 6/1996 | Raby | |
| 5,926,220 A | 7/1999 | Linzer | |
| 5,990,978 A * | 11/1999 | Kim et al. | 348/663 |
| 6,055,024 A | 4/2000 | DiMeo et al. | |
| 6,459,457 B1 | 10/2002 | Renner et al. | |
| 6,774,954 B1 | 8/2004 | Lee | |
| 2004/0174464 A1 | 9/2004 | MacInnis et al. | |
| 2006/0176405 A1 * | 8/2006 | Chen | 348/638 |

OTHER PUBLICATIONS

Masafumi Yugami, et al., "*EDTV with Scan-Line Video Processor*", IEEE Transactions on Consumer Electronics, vol. 38, No. 3, Aug. 1992, pp. 553-562.
Renner, et al., "*Motion Detector for a Video Display System*", patent application being filed on the same day as the instant application.

* cited by examiner

*Primary Examiner*—M. Lee
(74) *Attorney, Agent, or Firm*—Wade J. Brady, III; Frederick J. Telecky, Jr.

(57) ABSTRACT

Systems and method are provided for luma-chroma separation. A demodulator system demodulates a composite video signal to produce at least two baseband chroma signals. A given baseband chroma signal contains chroma information for one of a plurality of video frames comprising the composite signal. A three-dimensional (3-D) comb filter removes luma information from a given baseband chroma signal by combining sets of at least two baseband chroma signals to form a 3-D filtered baseband signal.

22 Claims, 4 Drawing Sheets

SYSTEMS AND METHODS FOR SEPARATING LUMA AND CHROMA INFORMATION IN A COMPOSITE VIDEO SIGNAL

TECHNICAL FIELD

The present invention relates generally to electrical circuits, and more particularly to systems and methods for separating luma and chroma information within a composite video signal.

BACKGROUND

A video display operates by displaying video images in response to a composite video signal received from a video source. The composite video signal comprises both luminance (luma) and chrominance (chroma) information. The luma portion contains the brightness, or black-and-white information for a given series of pixels, and the chroma portion contains the color information for the series of pixels. There are several standards for video signals commonly in use today, one being the National Television Standards Committee (NTSC), which is used in the United States and Japan. In NTSC, the chroma portion of a composite signal shifts in phase by one hundred eighty degrees between the corresponding pixels on consecutive lines and frames. Another standard for video signals is Phase Alternating Lines (PAL), which is used in Europe. In PAL, the chroma component of the composite signal shifts in phase by approximately 270 degrees from line to line.

It will be appreciated chroma information within a composite video signal can be carried within the same frequency band as the luma information. After the horizontal sync pulse, a reference sine wave are added as a color burst. Following the color burst, a phase shift in the chrominance signal indicates the color to display. The amplitude of the signal determines the saturation. The chrominance signal is separated out of the composite video signal and decodes it, along with the normal intensity signal, to determine the color content of the input signal.

When received by video display, the composite video signal is typically input to a video decoder, which separates the luma and chroma information and applies gain and offset factors to them in order to map them to a standard output range. A problem arises from portions of the luma signal that intrude into or near a frequency band associated with the chroma subcarrier. The intruding portion of the luma signal can be demodulated and output from the video decoder along with the chroma signal, resulting in a display of false color. This problem can be seen around sharp contours in text characters and diagonal lines. Another problem that can occur is dot crawl, which occurs when chroma information intrudes into the luma portion of the frequency band. For example, dot crawl can occur where two different colors are adjacent to one another horizontally.

SUMMARY

In accordance with an aspect of the present invention, a video decoder system employing luma-chroma separation is provided. An input terminal receives a composite video signal. A demodulator system demodulates the composite video signal to produce at least two baseband chroma signals. A given baseband chroma signal contains chroma information for one of a plurality of video frames comprising the composite signal. A three-dimensional (3-D) comb filter removes luma information from a given baseband chroma signal by combining sets of at least two baseband chroma signals to form a 3-D baseband chroma signal.

In accordance with an aspect of the present invention, a video display system is provided. An input terminal receives a composite video signal. A demodulator system demodulates a composite video signal to produce at least two baseband chroma signals. A given baseband chroma signal contains chroma information for one of a plurality of video-frames comprising the composite signal. A luma-chroma separation system includes a three-dimensional (3-D) comb filter that removes luma information from a given baseband chroma signal by combining sets of at least two baseband chroma signals to form a 3-D baseband signal. The luma-chroma separation system further includes a modulator remodulates the filtered baseband signal onto an associated carrier signal to produce a modulated chroma signal and a difference element subtracts the modulated chroma signal from the composite video signal to produce a first luma signal.

In accordance with yet another aspect of the present invention, a method is provided for separating luma and chroma data within a composite video signal. The composite video signal is delayed to produce a delayed signal. The composite video signal and the delayed signal are demodulated to produce respective first and second baseband signals. The first and second baseband signals are combined to produce a filtered chroma signal. The filtered chroma signal is remodulated to produce a modulated chroma signal. The modulated chroma signal is subtracted from the composite video signal to produce a remodulated luma signal.

BRIEF DESCRIPTION OF THE DRAWINGS

The foregoing and other aspects of the present invention will become apparent to those skilled in the art to which the present invention relates upon reading the following description with reference to the accompanying drawings.

DETAILED DESCRIPTION

Figure 1:
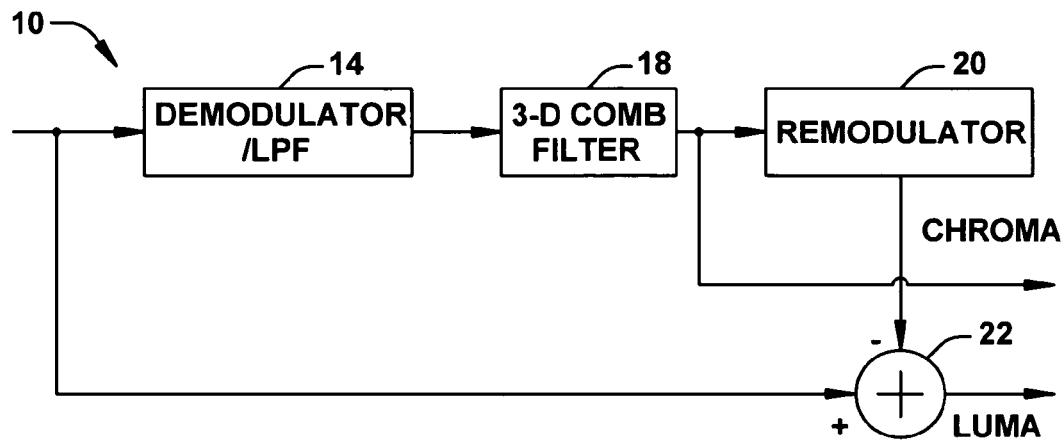
FIG. 1 illustrates a video decoder system that separates color information within a composite video signal from black and white information within the signal in accordance with an aspect of the present invention.

FIG. 1 illustrates a motion detection system 10 that separates color information, or chroma, within a composite video signal from black and white information, or luma. A composite video signal is received at a demodulator system 14, which demodulates the composite signal to provide a baseband chroma signal based on at least one provided reference signal. For example, the reference signals can provide sine and cosine reference signals that allow in-phase and quadrature components comprising the baseband chroma signal to be extracted from the composite signal. The remainder of the composite signal can be eliminated by a low pass filter associated with the demodulator system 14.

The demodulator system 14 can interface with one or more delay elements (not shown) to produce delayed representations of the chroma signal. For example, each delay element can delay the signal by one frame to produce one or more delayed signals representing corresponding chroma data for subsequent frames. Accordingly, a plurality of baseband signals containing chroma data for corresponding frames can be provided to a three-dimensional (3-D) comb filter 18. It will be appreciated that the baseband signals comprise signals having a frequency lower than that associated with the color subcarrier within the composite signal.

The 3-D comb filter 18 combines the data from adjacent frames to remove the luma information from the chroma signals. For example, the comb filter 18 can generate a linear combination of two or more chroma signals to remove the luma information from the signal. For example, in an NTSC system, after demodulation, the luma signal inverts in phase from frame to frame. Accordingly, adding a first signal representing a first frame from a second signal representing another frame should eliminate the luma information while retaining the chroma information. It will be appreciated, however, that the comb filter can employ a more complex combination of the signals to recover the chroma information. The filtered baseband chroma signal provides a chroma output for the decoder 10.

In accordance with an aspect of the present invention, once a filtered baseband chroma signal has been recovered at the comb filter, it is provided to a remodulator 20. The remodulator 20 modulates the filtered baseband chroma signal with a desired carrier signal, for example, the reference signal provided to the demodulator system 14. In the illustrated implementation, baseband chroma signal can be modulated in the same manner as the original input signal, such that the output of the remodulator 20 provides a representation of the chroma information contained in the original input signal. The modulated signal can then be provided to a difference element 22, along with the original input signal. The difference element 22 subtracts the remodulated chroma signal from the original composite signal. The resulting signal contains the luma data from the composite signal.

Figure 2:
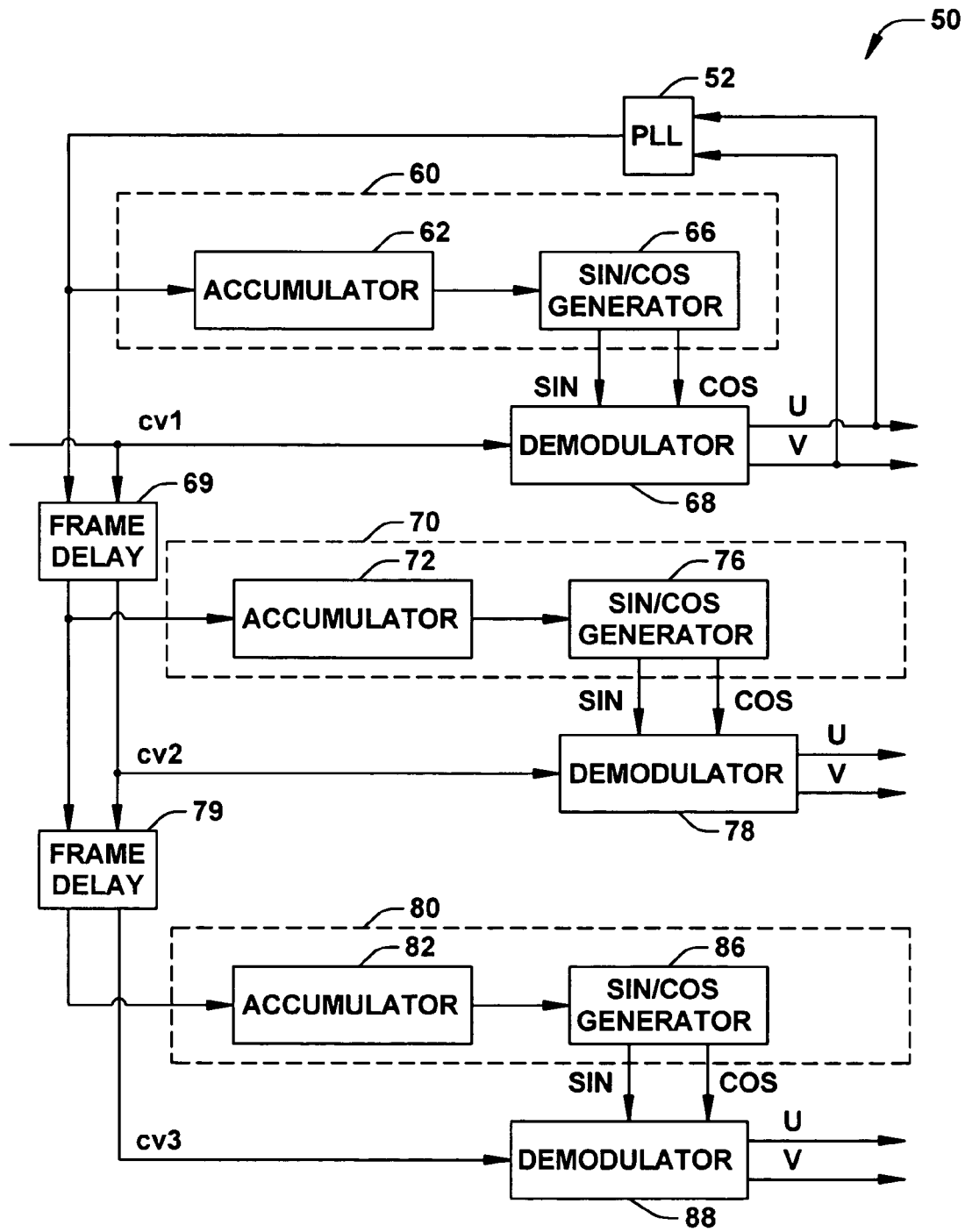
FIG. 2 illustrates a demodulation system for a video decoder in accordance with an aspect of the present invention.

FIG. 2 illustrates a demodulation system 50 for a video decoder in accordance with an aspect of the present invention. The illustrated demodulation system 50 provides three sets of chroma components, maintained at a desired phase via a phase locked loop 52 and synchronization between a plurality of discrete time oscillators 60, 70, and 80. Each set of chroma components represents the chroma data from one video frame from a sequence of video frames. These chroma components can be provided to a comb filter (not shown) that combines the data from the chroma components as to produce a set of filtered chroma components.

An input chroma signal, cv1, is provided to a discrete time oscillator 60. The discrete time oscillator 60 comprises an accumulator 62 and a sine/cosine generator 66. The discrete time oscillator 60 provides sine and cosine reference signals to the demodulator 68. The demodulator 68 uses the provided reference signals to extract an in-phase and a quadrature component from the composite video signal. The in-phase and quadrature components represent the two chroma components, u and v, for the frame represented by the input composite signal.

The reference signals provided by the discrete time oscillator 60 are maintained in phase via a synchronization signal provided to the accumulator 62 via the phase locked loop 52. The synchronization signal provides an increment value to the accumulator 62, and the accumulated sum is provided to the sine/cosine generator 66. The sine/cosine generator 66 provides sine and cosine outputs having a frequency and phase corresponding to the accumulator output to the demodulator 68. The output of the demodulator 68 is provided as feedback to the phase locked loop 52 for the calculation of a new increment value.

The input composite signal, cv1, is also provided to a first frame delay element 69. The first frame delay element 69 delays the signal stream by exactly one frame as to produce a second composite signal, cv2, representing a second frame. A second increment value is provided to a second discrete time oscillator 70. The second discrete time oscillator 70 includes a second accumulator 72 and a second sine/cosine generator 76. The second discrete time oscillator 70 provides sine and cosine reference signals to a second demodulator 78, allowing the two chroma components to be extracted from the second signal stream.

Similarly, the second signal stream, cv2, is also provided to a second frame delay element 79. The second frame delay element 79 delays the signal stream by one frame as to produce a third signal stream, cv3, representing a third frame. A third increment value is provided to a third discrete time oscillator 80. The third discrete time oscillator 80 includes a third accumulator 82 and a third sine/cosine generator 86. The third discrete time oscillator 80 provides sine and cosine reference signals to a third demodulator 88, allowing the two chroma components, representing the third frame, to be extracted from the third signal stream.

The second and third discrete time oscillators 70 and 80 are synchronized with the first discrete time oscillator at a synchronization point in each frame. It will be appreciated that this synchronization point can occur at any point in the frame, for example, at the beginning of the frame. During synchronization, the values stored at the first and second accumulators are stored in memory. The second accumulator is provided with the value of the stored value of the first accumulator from the last frame, and the third accumulator is provided with the stored value of the second accumulator from the previous frame. This synchronization allows each of the signals provided by the demodulation system 50 to be maintained in an accurate phase relation to a reference signal, such as the chroma subcarrier with the composite input signal.

Figure 3:
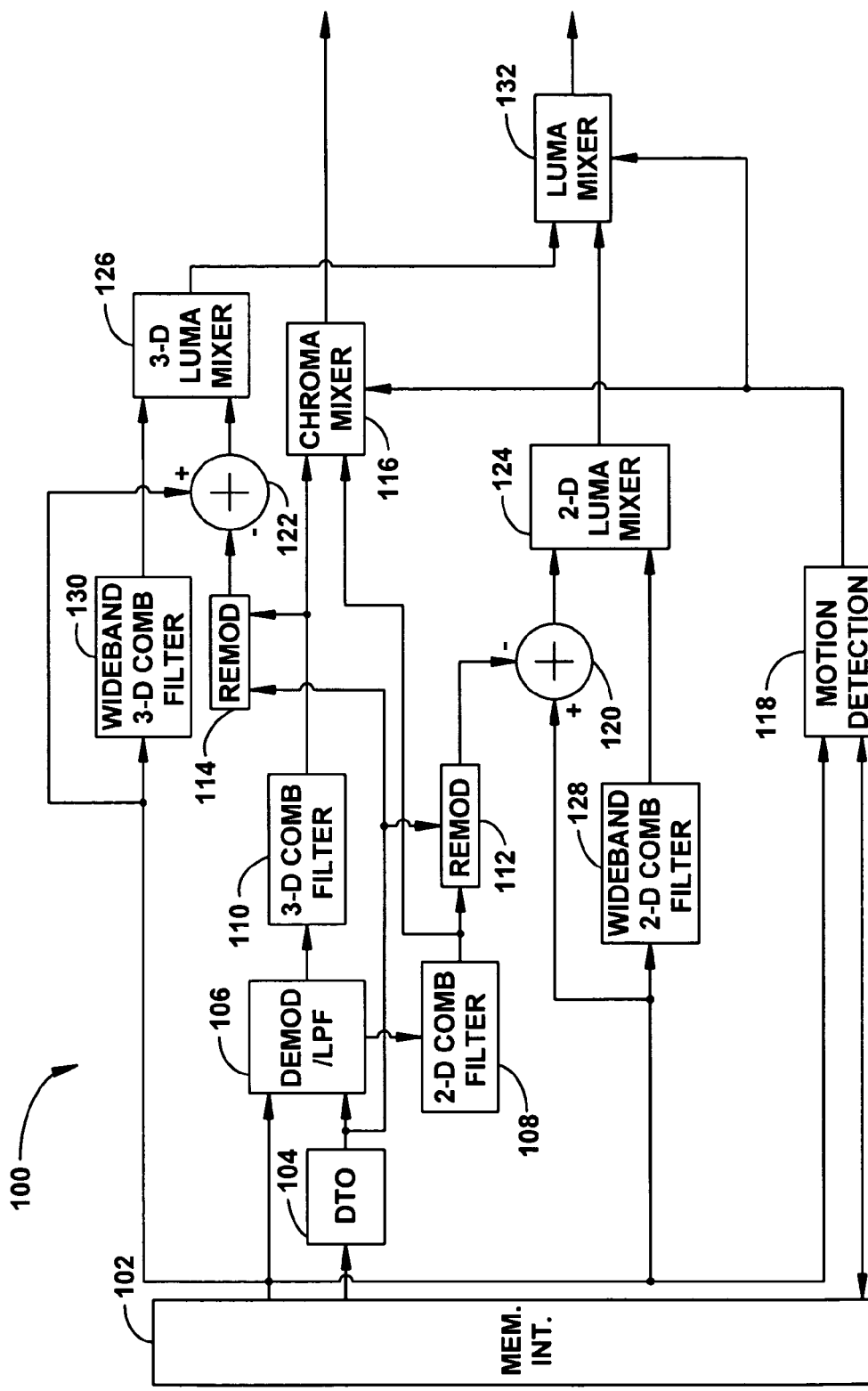
FIG. 3 illustrates a luma-chroma separation system in accordance with an aspect of the present invention.

FIG. 3 illustrates a luma-chroma separation system 100 in accordance with an aspect of the present invention. The luma-chroma separation system 100 incorporates a memory interface 102 that facilitates communication between signals stored in a memory (not shown) and the other components of the luma-chroma separation system 100. The memory interface 102 provides a reference signal to a discrete time oscillator (DTO) 104. The DTO 104 provides sine and cosine reference signals, representing in-phase and quadrature components of the chroma carrier signal, to a demodulator system 106.

A composite video signal is then provided to the demodulator system 106, and a set of baseband chroma signals are extracted. All other components can be filtered out by a low pass filter within the demodulator system 106. The extracted signal set can then be provided to a 2-D comb filter 108. The 2-D comb filter 108 eliminates extraneous luma information within the chroma signal set by combining lines, generally adjacent or spatially proximate lines, that contain similar information. Each line output from the 2-D comb filter 108 is a linear combination of two or more adjacent lines, weighted according to a set of filter coefficients.

In an exemplary implementation, the 2-D comb filter 108 can include control logic that controls the filter coefficients in response to one or more conditions of the signal. These conditions can include the encoding of the signal (e.g., PAL, NTSC, etc.), any spatial color transitions associated with a given frame, and other special qualities of the image in the frame that might affect the performance of the filter. This control logic can be made to be programmable for a specific application, such that structurally identical units can respond to a given signal in different ways. In one implementation, the programmable logic can be adjusted according to the judgment of a human operator viewing a video display generated from the output of the system 100.

In accordance with an aspect of the present invention, the demodulation system 106 can include a plurality of demodulators maintained in synchronization. The demodulators can be provided with delayed versions of the composite signal from the memory interface 102 to produce sets of delayed chroma signals representing additional frames in the video input. The original and delayed signal sets are provided to a 3-D comb filter 110. The 3-D comb filter 110 eliminates extraneous luma information within the chroma signal set by combining frames, for example consecutive or temporally proximate frames, that contain similar information (e.g., no interframe motion). Each frame output from the 3-D comb filter 110 is a linear combination of two or more frames within the video signal, weighted according to a set of filter coefficients. The 3-D comb filter 110 can contain control logic similar to that of the 2-D comb filter 108. This control logic can also be programmable according to the requirements of a specific application, for example, by a human operator upon viewing a video display generated from the output of the system 100.

The output of the 2-D comb filter 108 and the 3-D comb filter 110 are provided to respective remodulators 112 and 114. The remodulators 112 and 114 modulate the output of their associated comb filters 108 and 110 to provide respective 2-D and 3-D modulated chroma signals. The remodulators 112 and 114 can receive the sine and cosine reference signals from the DTO 104 or an appropriate reference signal from another source that allows the chroma signals to be remodulated in the same fashion as the original chroma subcarrier signal.

The outputs of the comb filters 108 and 110 are provided to a chroma mixer 116. The chroma mixer 116 combines the 2-D and the 3-D baseband chroma signals for a given pixel of video data. The signals are mixed according to input from a motion detector 118 that examines corresponding pixels across a plurality of frames to determine the amount of motion between frames within the signal. The specifics of the motion detection will vary with the application and the nature of the composite signal. It will be appreciated that both the chroma mixer 116 and the motion detector 118 can include control logic programmable by an operator.

The modulated chroma signals are provided to respective difference elements 120 and 122. The original composite signal is also provided to the difference elements 120 and 122, and the modulated chroma signals are subtracted from the original signal to produce respective 2-D and 3-D luma signals. The remodulated luma signals can be provided to respective 2-D and 3-D luma mixers 124 and 126. In the illustrated implementation, the original composite signal can be provided, respectively, to 2-D and 3-D wideband comb filters 128 and 130. The 2-D wideband comb filter 128 produces a 2-D wideband luma signal in which each output line comprises a linear combination of lines from a given video frame. For example, in an NTSC system, adding adjacent lines with similar information can cancel out the chroma information within the signal, as the chroma information inverts phase at each adjacent line. It will be appreciated that the 2-D wideband comb filter 128 can include control logic for adaptively adjusting the filter coefficients according to characteristics of the wideband signal, including user programmable control elements.

Similarly, the 3-D wideband comb filter 130 produces a 3-D wideband luma signal in which each output pixel comprises a linear combination of pixels from a plurality of proximate video frames. For example, in an NTSC system, adding lines in adjacent frames with similar information can cancel out the chroma information within the signal, as the chroma information inverts phase at each successive frame. The 3-D wideband comb filter can also include control logic for the adaptive adjustment of filter coefficients according to detected signal characteristics, including user programmable control elements.

The 2-D and 3-D wideband signals can be provided, respectively, to the 2-D and 3-D luma mixers 124 and 126. Each luma mixer (e.g., 124) combines the output of its associated difference element (e.g., 116) with its associated wideband signal to provide a composite luma signal. For example, the output of the luma mixers 124 and 126 can comprise a weighted linear combination of their respective input signals. The luma mixers 124 and 126 contain internal control logic that controls the weighting of the linear combination according to characteristics of the input signals. For example, the characteristics can include any spatial or temporal color transitions associated with a given frame or series of frames represented by the signals. The composite luma signals are provided to a luma mixer 132. The luma mixer 132 combines the 2-D and 3-D luma signals for a given pixel of video data. The signals are mixed according to input from the motion detector 118. The luma mixer 132 can include control logic programmable by an operator. The luma mixer 132 and the chroma mixer 116 operate to provide pure chroma and luma components of the original composite signal.

Figure 4:
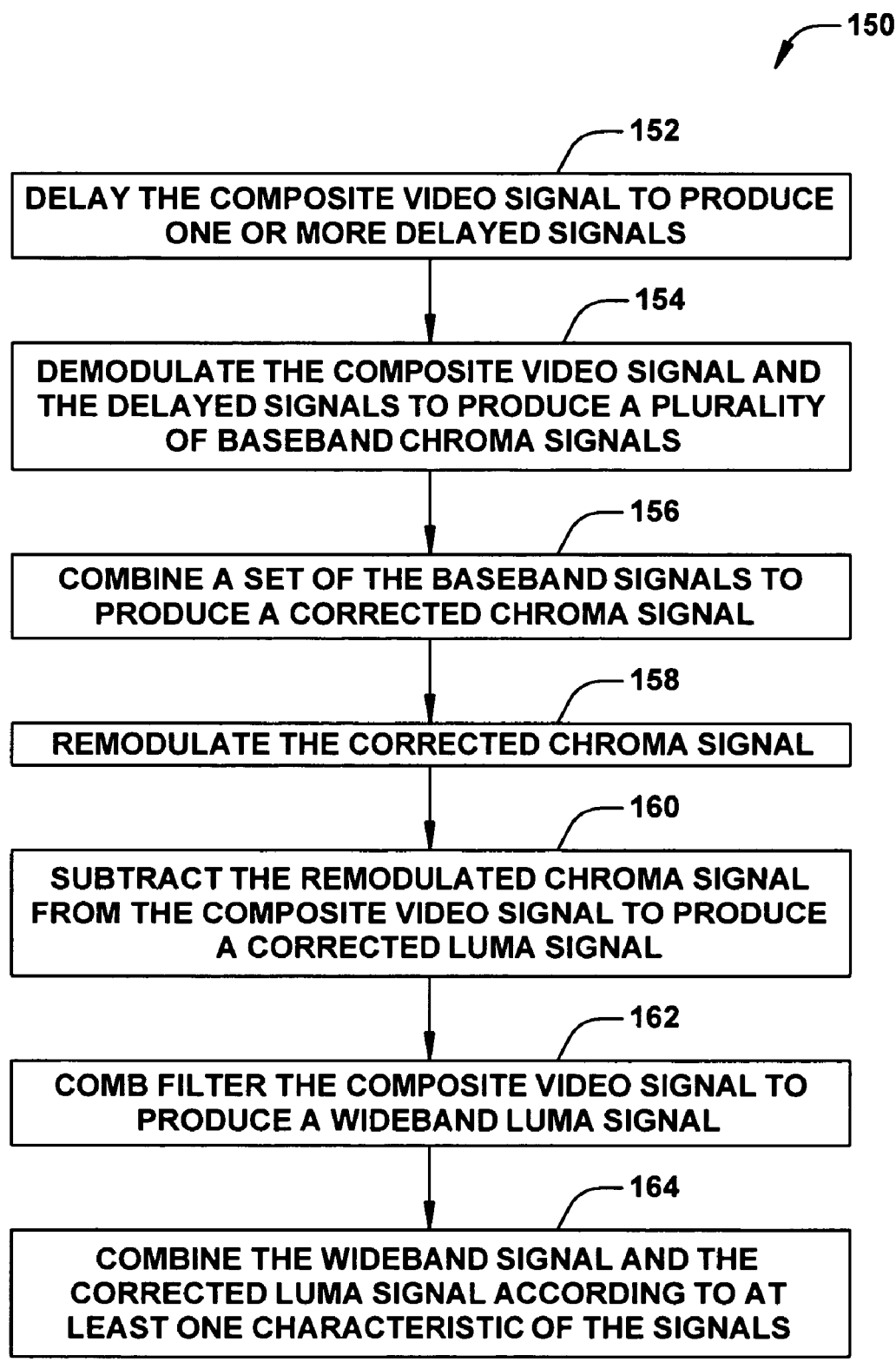
FIG. 4 illustrates a methodology for luma-chroma separation in accordance with an aspect of the present invention.

In view of the foregoing structural and functional features described above, a methodology in accordance with various aspects of the present invention will be better appreciated with reference to FIG. 4. While, for purposes of simplicity of explanation, the methodology of FIG. 4 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 4 illustrates a methodology 150 for separating luma and chroma data within a composite video signal. At 152, the composite video signal is delayed to produce a delayed signal. For example, the composite video signal can be delayed by one frame one or more times to form one or more delayed signals representing successive frames. At 154, the composite video signal and the delayed signals are demodulated to produce a plurality of baseband chroma signals. Each of these baseband chroma signals can include in-phase and quadrature chroma components of the original composite signal. In one implementation, the demodulation of the signals is performed at a plurality of demodulators. A first demodulator is maintained at a desired phase via a phase locked loop and all of the other demodulators are synchronized to the first demodulator to maintain all of the baseband signals at the desired phase.

At 156, a set of the plurality of baseband signals are combined to produce a filtered chroma signal. Since the phase of the chroma signal varies from frame to frame in PAL and NTSC, any luma information remaining in the baseband signals can be eliminated via a proper linear combination of corresponding chroma signals from the plurality of frames. The filtered chroma signal is remodulated to produce a modulated chroma signal at 158. It will be appreciated that this remodulation can be performed using the same reference signal as the demodulation, such that the modulated chroma signal resembles the original chroma subcarrier from the composite signal. At 160, the modulated chroma signal is subtracted from the composite video signal to produce a remodulated luma signal.

A further refinement of the luma signal can be achieved by producing an additional luma signal to supplement the remodulated luma signal. At 162, the composite video signal is comb filtered to produce a wideband luma signal. At 164, the wideband luma signal is combined with the remodulated luma signal to produce a composite luma signal. In an exemplary implementation, the composite luma signal represents a weighted linear combination of the remodulated luma signal and the wideband luma signal. The weights for this linear combination can be determined adaptively according to one or more characteristics of the two luma signals. These characteristics can include the encoding of the signals (e.g., PAL, NTSC, etc.), any vertical or horizontal color transitions associated with a given frame, and other special qualities of the signals that might affect the accuracy of the luma-chroma separation.

Figure 5:
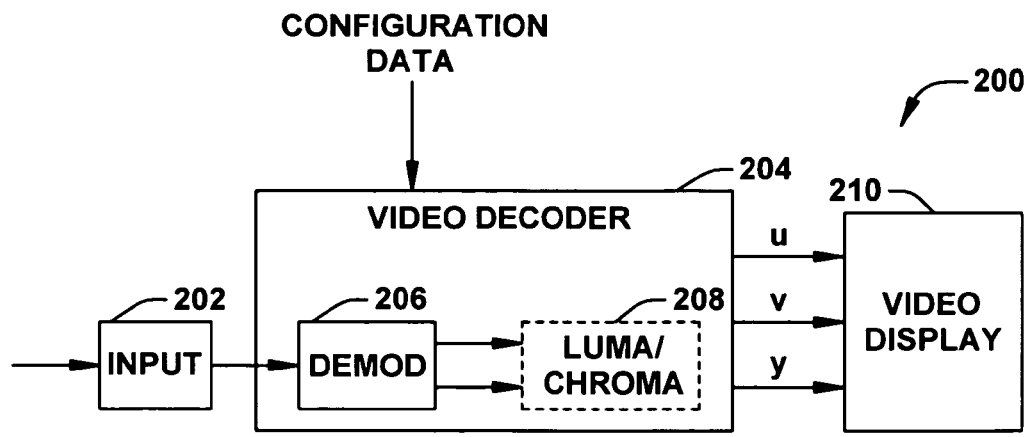
FIG. 5 illustrates a functional block diagram of a video display system in accordance with an aspect of the present invention.

FIG. 5 illustrates a functional block diagram of a video display system 200. It will be appreciated that the illustrated video display system is provided solely for the purpose of example, and that a luma-chroma separation system in accordance with one or more aspects of the present invention can be used in a variety of video display systems. In the illustrated implementation, a composite video signal is applied to an input terminal 202 and supplied to a video decoder 204. The video decoder includes a demodulator 206, in accordance with an aspect of the present invention, that produces a plurality of baseband chroma signals representing respective video frames from the composite video signal. These baseband chroma signals are then provided to a luma-chroma separator 208, in accordance with an aspect of the present invention, that detects and separates the digital composite video signal to provide a luma signal and a chroma signal. These signals are the provided to a video display 210 for display to a user.

In accordance with an aspect of the present invention, the luma-chroma separator 208 can include one or more programmable components responsive to configuration data from an operator. For example, one or more comb filters associated with the luma-chroma separator 208 can be programmed by an operator to change respective sets of filter coefficients associated with the filters. Similarly, internal control logic, responsive to one or more characteristics of the signal input to the filters, can be adjusted to adapt the video decoder 204 to a desired application. In accordance of an aspect of the invention, a human operator can evaluate the performance of the video display system 200, and reconfigure the luma-chroma separator 208 to improve the appearance of the displayed video. Accordingly, a standard luma-chroma separation component 208 can be utilized for a number of applications, with appropriate configuration data being provided to optimize its performance for a given application.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A video decoder system employing luma-chroma separation comprising:
    a demodulator system that demodulates a composite video signal to produce at least two baseband chroma signals, a given baseband chroma signal containing chroma information for an associated one of a plurality of video frames comprising the composite signal; and
    a three-dimensional (3-D) comb filter that removes luma information from a given baseband chroma signal by combining sets of at least two baseband chroma signals to form a 3-D filtered baseband signal.

2. The system of claim 1, the 3-D comb filter comprising control logic such that a set of filter coefficients associated with the filter can be altered in response to at least one characteristic of the at least two baseband chroma signals.

3. The system of claim 2, the control logic being configurable by a human operator as to adjust the video decoder system for a desired application.

4. The system of claim 1, further comprising:
    a modulator that remodulates the 3-D filtered baseband signal onto an associated carrier signal to produce a modulated chroma signal; and
    a difference element that subtracts the modulated chroma signal from the composite video signal to produce a first luma signal.

5. The system of claim 4, further comprising a wideband 3-D comb filter that receives the composite video signal and at least one delayed representation of the composite video signal to provide a second luma signal and a luma mixer that provides a composite luma signal comprising a linear combination of the first luma signal and the second luma signal.

6. The system of claim 5, the luma mixer comprising control logic that determines a set of weights associated with the linear combination of the first and second luma signals according to at least one characteristic of the first and second luma signals.

7. The system of claim 1, further comprising a memory interface operative to provide at least one delayed composite video signal, each delayed composite video signal representing one of the plurality of video frames.

8. The system of claim 7, the demodulator system comprising a plurality of demodulators, a given demodulator being operative to demodulate one of the delayed composite video signals to produce a baseband signal representing the video frame associated with the composite signal.

9. The system of claim 8, a first demodulator from the plurality of demodulators being maintained in phase via a phase locked loop and at least one of the plurality of demodulators being maintained in phase via synchronization with the first demodulator.

10. The system of claim 9, each of the plurality of demodulators comprising an associated accumulator, wherein an accumulator value associated with the first demodulator is stored each frame and provided to an accumulator associated with a second demodulator in the following frame.

11. The system of claim 1, the at least two baseband chroma signals comprising a first baseband chroma signal, and the system further comprising:
- a two-dimensional (2-D) comb filter that receives the first baseband chroma signal and filters the first baseband chroma signal as to provide a 2-D filtered chroma baseband signal;
- a remodulator that provides a modulated chroma signal from the 2-D filtered baseband chroma signal; and
- a difference element that subtracts the modulated chroma signal from the composite video signal to produce a first luma signal.

12. The system of claim 11, further comprising a chroma mixer that combines the first baseband chroma signal and the second baseband chroma signal based upon input from an associated motion detector.

13. The system of claim 12, further comprising a wideband 2-D comb filter that filters the composite video signal to provide a second luma signal and a 2-D luma mixer that provides a composite 2-D luma signal comprising a linear combination of the first luma signal and the second luma signal.

14. The system of claim 13, further comprising:
- a second modulator that remodulates the corrected 3-D baseband chroma signal onto an associated carrier signal to produce a modulated chroma signal;
- a difference element that subtracts the modulated chroma signal from the composite video signal to produce a first 3-D luma signal;
- a wideband 3-D comb filter that receives the composite video signal and at least one delayed representation of the composite video signal to provide a second 3-D luma signal;
- a 3-D luma mixer that provides a composite 3-D luma signal comprising a linear combination of the first luma signal and the second luma signal; and
- a composite luma mixer that combines the 2-D composite luma signal and the 3-D composite luma signal based upon input from an associated motion detector to provide a luma output for the video decoder system.

15. A video display system, comprising:
- an input terminal that receives a composite video signal;
- a demodulator system that demodulates a composite video signal to produce at least two baseband chroma signals, a given baseband chroma signal containing chroma information for one of a plurality of video frames comprising the composite signal; and
- a luma-chroma separation system, comprising:
  - a three-dimensional (3-D) comb filter that removes luma information from a given baseband chroma signal by combining sets of at least two baseband chroma signals to form a 3-D filtered baseband signal;
  - a modulator that remodulates the filtered baseband signal onto an associated carrier signal to produce a modulated chroma signal; and
  - a difference element that subtracts the modulated chroma signal from the composite video signal to produce a first luma signal.

16. The video display system of claim 15, the luma-chroma separation system further comprising a wideband 3-D comb filter that receives the composite video signal and at least one delayed representation of the composite video signal and provides a second luma signal and a luma mixer that provides a composite luma signal comprising a linear combination of the first luma signal and the second luma signal.

17. The video display system of claim 15, the at least two baseband chroma signals comprising a first baseband chroma signal, and the system further comprising:
- a two-dimensional (2-D) comb filter that receives the first baseband chroma signal and filters the first baseband chroma signal as to provide a 2-D filtered chroma baseband signal;
- a second remodulator that provides a modulated chroma signal from the 2-D filtered baseband chroma signal; and
- a second difference element that subtracts the modulated chroma signal from the composite video signal to produce a second luma signal.

18. The video display system of claim 17, further comprising a chroma mixer that combines the 2-D filtered baseband chroma signal and the 3-D filtered baseband chroma signal based upon input from an associated motion detector.

19. A method for separating luma and chroma data within a composite video signal, comprising:
- delaying the composite video signal to produce at least one delayed signal;
- demodulating the composite video signal and the at least one delayed signal to produce respective baseband chroma signals;
- combining the baseband chroma signals to produce a filtered chroma signal;
- remodulating the filtered chroma signal to produce a modulated chroma signal; and
- subtracting the modulated chroma signal from the composite video signal to produce a remodulated luma signal.

20. The method of claim 19, further comprising comb filtering the composite video signal to produce a wideband luma signal and combining the wideband luma signal with the remodulated luma signal to provide a composite luma signal.

21. The method of claim 20, wherein combining the wideband luma signal and the remodulated luma signal includes creating a weighted linear combination of the wideband luma signal and the remodulated luma signal, where a set of weights associated with the weighted linear combination is determined according to at least one characteristic of the wideband luma signal and the remodulated luma signal.

22. The method of claim 19, wherein demodulating the composite video signal and the delayed signal comprises:
- maintaining a first of a plurality of demodulators at a desired phase via a phase locked loop;
- storing an accumulator value associated with the first demodulator at a synchronization point in a first frame; and
- providing the stored accumulator value to an accumulator associated with a second of the plurality of demodulators at a synchronization point in a second frame.

* * * * *